United States Patent [19]

Galazin et al.

[11] Patent Number: 5,088,763
[45] Date of Patent: Feb. 18, 1992

[54] APPARATUS FOR MOUNTING A TRAILING ARM AIR SUSPENSION TO A SLIDING FRAME

[75] Inventors: Gregory T. Galazin, Montague; William C. Pierce, Muskegon, both of Mich.

[73] Assignee: Neway Corp., Muskegon, Mich.

[21] Appl. No.: 625,842

[22] Filed: Dec. 11, 1990

[51] Int. Cl.⁵ .................. B60G 11/26; B62D 21/00
[52] U.S. Cl. ............................ 280/713; 280/788; 280/800; 280/638
[58] Field of Search .............. 280/711, 96.1, 663, 280/787, 638, 656, 405.1, 406.1, 788, 713, 781, 800, 702, 688

[56] References Cited

U.S. PATENT DOCUMENTS

Re. 30,308  6/1980  Masser ........................... 280/713
4,877,293  10/1989  French et al. .................. 280/405.1

FOREIGN PATENT DOCUMENTS 0896181  5/1962  United Kingdom ............... 280/702

*Primary Examiner*—Kenneth R. Rice
*Assistant Examiner*—Paul Dickson
*Attorney, Agent, or Firm*—Varnum, Riddering, Schmidt & Howlett

[57] ABSTRACT

An improved connection is provided for mounting a trailing arm air suspension to the subframe of a slider suspension. A beam is welded to the bottom of a pair of frame rails, and a hanger bracket is welded to the bottom of the beam. One or more gussets is mounted to the beam to strengthen the connections between the hanger bracket and the beam and the beam and the frame rail. The connection also includes a support bracket for the air spring. The support bracket includes upper and lower flanges, with the lower flange mounting an upper end of the air spring and being mounted to the bottom of the frame rail. The upper flange extends acutely upwardly from the lower flange and is connected to an upper portion of the frame rail.

14 Claims, 5 Drawing Sheets

APPARATUS FOR MOUNTING A TRAILING ARM AIR SUSPENSION TO A SLIDING FRAME

BACKGROUND OF THE INVENTION

1. Field of the Invention

This invention relates to slider suspensions for trailers and more particularly to an apparatus for attaching a trailing arm air suspension to a subframe of a slider suspension.

2. Scope of the Prior Art

Slider suspensions are frequently used with truck trailers where it is desirable to adjust the space between the trailer axles and the drive axles on the tractor. Typically, the trailer is formed with a structural boxlike container. Unlike conventional trailers, there is no frame beneath the container. Rigidity is achieved through the construction of the container. A pair of rails are mounted at a rear portion of the trailer, and the suspension system is mounted to the rails for slidable movement in a fore and aft direction. The suspension system includes a subframe and axles and wheels suspended from the subframe. When the suspension is moved in the aft direction, the spacing between the trailer axles and the drive axles on the tractor is increased. Conversely, when the suspension is moved in the forward direction, the spacing is decreased.

Typically, slider suspensions utilize leaf springs to suspend the axles from the subframe. Leaf spring suspensions are considerably less expensive and lighter in weight than air suspensions which include a pivotable trailing arm and an air spring. However, the ride provided by a leaf spring suspension tends to be relatively harsh which negatively affects vehicle durability, promotes cargo damage, and adversely affects the maneuverability and handling of the tractor and trailer. To a lesser degree, air spring suspensions are used on slidable trailers. Air spring suspensions provide a smoother ride and improve the maneuverability and handling of the tractor and trailer. However, an air spring suspension has less connections for conducting lateral forces to the subframe than a leaf spring suspension. Thus, more stress is placed on the connections for an air spring suspension. Prior solutions to the problem have been directed at providing heavier-weight metal and strengthening the rigid connections between the trailing arm suspension and the frame.

SUMMARY OF THE INVENTION

The invention is directed to an improvement in a slider suspension comprising a subframe in a suspension wherein the subframe has a pair of parallel frame rails and connection means to connect the suspension to the subframe. The suspension is of the type including a trailing arm. The improvement in the connection means comprises a beam extending beneath the frame rails from an outer portion of one frame rail to an outer portion of the other frame rail. The beam is connected to the frame rails near the outer portions. A hanger bracket has an upper portion thereof mounted to a lower surface of the beam, and is adapted to pivotably mount the trailing arm of the suspension. A gusset is mounted to the beam and to the hanger bracket or the frame rail to provide lateral strength between the beam and the connected hanger bracket or frame rail. Preferably, all connections are welded.

In one aspect of the invention, the hanger bracket has a pair of arms mounted to the lower surface of the beam, and one of the arms has an outer surface. The beam has an end edge, and the outer surface of the arm, the end edge of the beam, and the outer portion of the frame rail are substantially in the same plane. In this embodiment, the gusset is a channel plate which is mounted to the outer surface, the end edge, and the outer portion, preferably by welding. A second gusset can also be provided between the beam and one of the frame rails.

Another aspect of the invention is directed to an improvement in the connection means where the suspension includes an air spring, the centerline of which is offset horizontally from one of the frame rails. In this aspect, the connection means comprises a one-piece support bracket having a lower flange and an upper flange. The lower flange is adapted to mount an upper end of the air spring and is disposed generally parallel to a plane extending through the pair of frame rails. The lower flange is mounted to a lower portion of one of the frame rails. The upper flange extends at an acute angle relative to the lower flange and is connected to an upper portion of the frame rail so that the bending moment created by the horizontal offset, when a load is placed on the air spring, will be transferred to the upper portion of the frame rail. Typically, the upper flange includes a strengthening rib. Both upper and lower flanges may be mounted to the frame rail by welding.

BRIEF DESCRIPTION OF THE DRAWINGS

The invention will now be described with reference to the following drawings in which.

DETAILED DESCRIPTION OF THE PREFERRED EMBODIMENT

Figure 1:
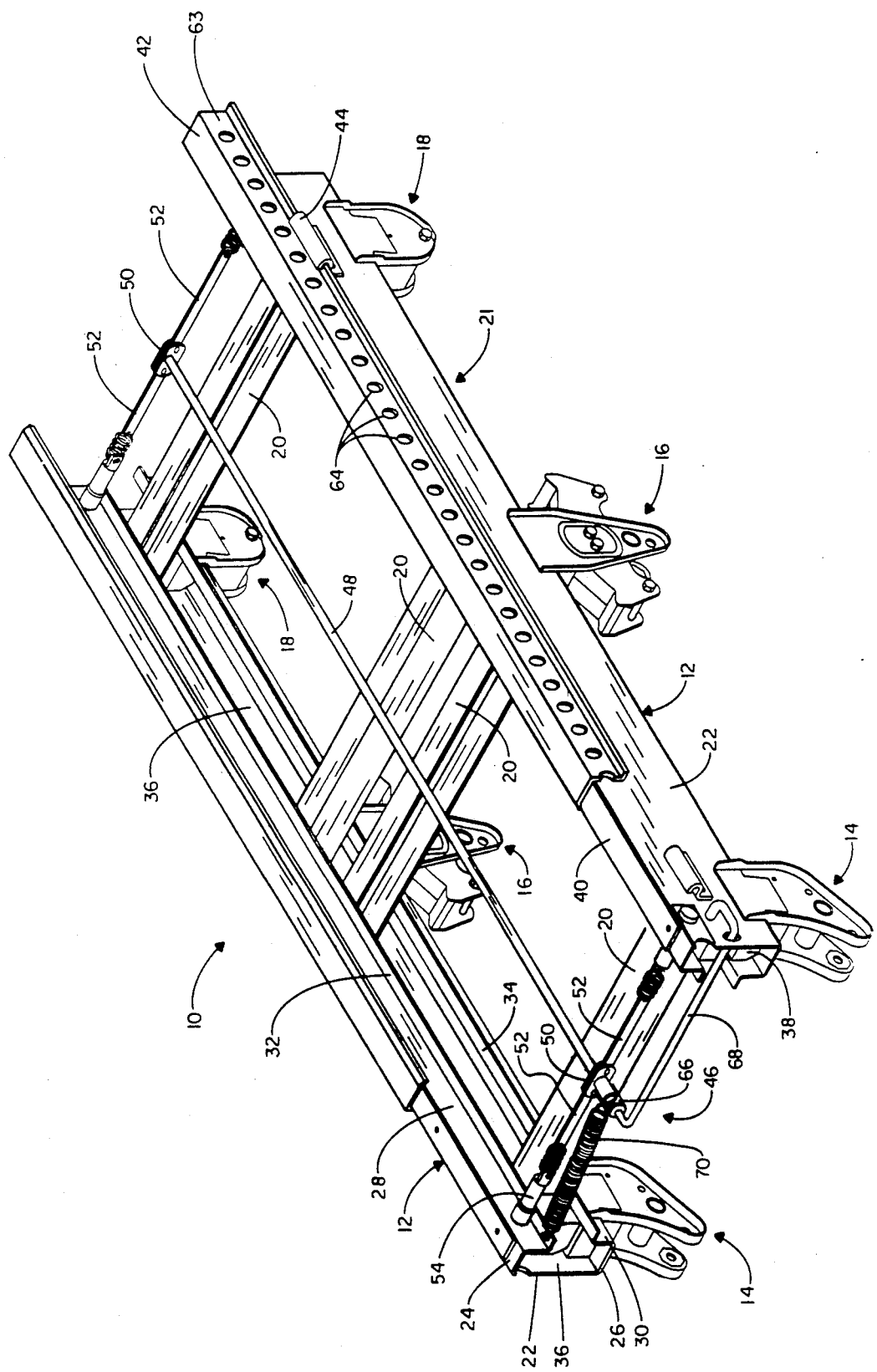
FIG. 1 is an isometric view of a prior art subframe of a slider suspension with mounting brackets for a leaf spring suspension.

Pertinent portions of a conventional slider suspension of the prior art are illustrated in FIG. 1. The illustrated embodiment is similar to a Model H-8800 slider assembly sold by Hutchens Industries, 215 North Patterson, Springfield, Mo. 65802. It can be seen that the slider suspension 10 is adapted for use with a leaf spring-type suspension (not shown) in a manner well known in the art. The slider suspension 10 comprises a pair of spaced frame rails 12 from which depend a plurality of hanger brackets, disposed as a pair of front hanger brackets 14, a pair of center hanger brackets 16, and a pair of rear hanger brackets 18. The hanger brackets 14, 16, and 18 are typically welded to the rails 12. Cross beams 20 are mounted to and between the frame rails 12 to form a subframe 21. Each frame rail 12 has a vertical side wall 22 disposed to define a side of the subframe 21. Each frame rail 12 also includes a top wall 24 and a bottom wall 26, each extending at approximately right angles from its corresponding side wall 22 and toward the oppositely disposed frame rail 12. An upper flange 28 depends from the top wall 24, and a lower flange 30 extends upwardly from the bottom wall 26. Each flange 28, 30 terminates in an upper lip 32 and a lower lip 34, respectively. Each frame rail 12 thus defines an open channel 36. The cross beams 20 extend into the channel 36 in each frame rail 12 and are welded to the interior surface of the side wall 22. Spacer brackets 38 are also provided within the channel 36 to provide strength and rigidity to the slider suspension 10.

A slider pad 40 is mounted to the upper surface of each top wall 24. A body rail 42 is received over the slider pad 40 and held in place for sliding movement thereon by hold-down clips 44. Although only one body rail 42 is shown in FIG. 1 for clarity, it will be understood that each frame rail 12 includes a body rail 42 for sliding movement thereon. The body rails 42 are adapted to be securely mounted to the underside of a boxlike container (see FIG. 7 for example) having sufficient structural rigidity to function as a trailer in a tractor-trailer combination. It can be seen that the subframe 21 slides relative to the body rails 42, and thus relative to a trailer compartment to which the body rails are secured.

The body rails 42 can be locked in a fixed position relative to the subframe 21 by a locking pin mechanism 46. The mechanism 46 comprises an elongated rod 48 disposed intermediate the frame rails 12 and generally parallel thereto. A cam 50 is mounted to each end of the rod 48 and a pair of links 52 extends from each cam toward a respective frame rail 12. A lock pin 54 is pivotably connected to each link 52. Looking now also at FIG. 4, briefly, it will be seen that an aperture 56 is located in the upper flange 28 at each end of each frame rail 12, and another aperture 58 is located in the side wall 22 at each end of each frame rail. The two apertures 56, 58 are in registry so that at each end of each frame rail, the lock pin 54 can project through the two apertures and outwardly of the side wall 22. A compression spring 60 is disposed within the channel 36 and surrounds the portion of the lock pin 54 between the two apertures. One end of the spring 60 bears against the interior surface of the upper flange 28, and the other end of the spring bears against a head 62 of the lock pin 54. Thus, each lock pin 54 is biased toward a position where at least a portion of the head 62 extends outwardly of the side wall 22. Referring again to FIG. 1, each body rail 42 has a flange 63 disposed adjacent the side wall 22 of the corresponding frame rail 12, and each flange contains a plurality of holes 64. The holes 64 are located so as to progressively come into registry with the apertures 56, 58 as the body rail 42 slides on the frame rail 12. It will be apparent that the lock pins 54 extend through the holes 64 in registry therewith to lock the body rails 42 in a predetermined position relative to the subframe 21.

A crank 66 is mounted to the rod 48 for rotation therewith, and a handle 68 is pivotably mounted to the crank 66. The handle typically extends through one of the side walls 22 for accessibility from outside the slider suspension 10. A spring 70 extends between the crank 66 and the rail 12 away from the handle 68 to bias the crank and the rod 48 to a position where the lock pins 54 engage the body rails 42. It will be apparent that pulling handle 68 outwardly of the slider suspension 10 will release the lock pins 54 from engagement with the body rails 42, whereupon the rails may be moved to a new position. The bias of the springs 70 and 60 tend to move the lock pins 54 toward engagement with the body rails 42 when the handle 68 is released.

Figure 2:
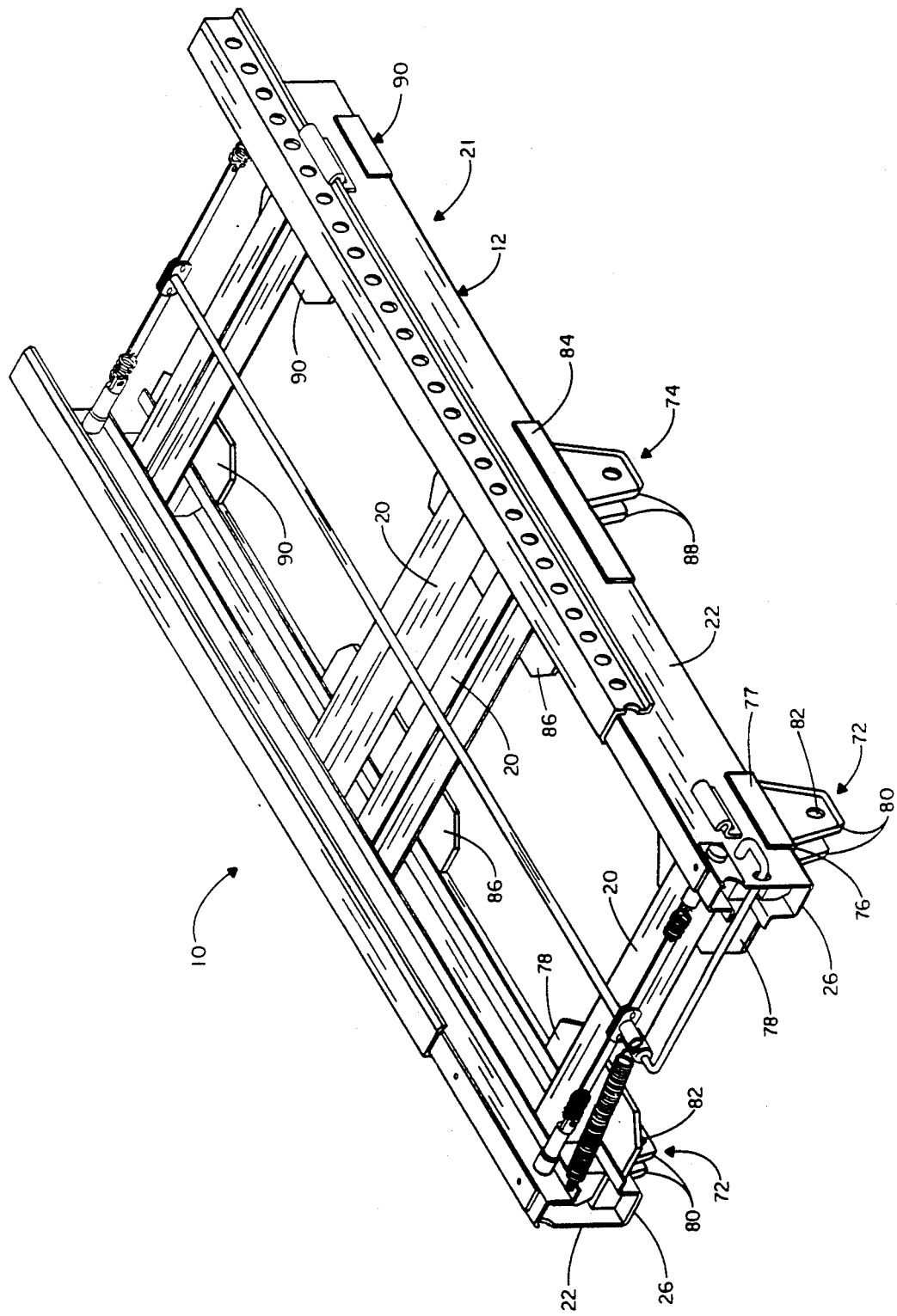
FIG. 2 is an isometric view of a prior art subframe for a slider suspension with mounting brackets for a trailing arm air suspension.

It is known to adapt the slider suspension 10 of FIG. 1 for use with trailing arm air suspensions. FIG. 2 illustrates an embodiment of a slider suspension 10 of the prior art adapted for mounting a trailing arm air suspension. In this embodiment, as with all subsequent embodiments, like elements will be identified with like numerals. It can be seen that the slider suspension 10 of the trailing arm embodiment of FIG. 2 is essentially the same as the slider suspension 10 of the leaf spring embodiment of FIG. 1 except for the hanger brackets. In FIG. 2, the slider suspension 10 includes a forward hanger bracket 72 and a rearward hanger bracket 74. The forward hanger bracket 72 includes a mounting plate 76 which is welded to the bottom wall 26 of the frame rail 12. The mounting plate 76 may include a portion 77 extending upwardly adjacent the side wall 22 and welded thereto. The mounting plate 76 further includes a support bracket 78 which extends inwardly of the frame rails 12 and is welded or otherwise secured to a cross beam 20. A pair of spaced arms 80 depend from and is welded to the mounting plate 76. The arms 80 may be integral with the web portion of a U-shaped bracket which is likewise welded to the mounting plate 76. The arms 80 include apertures 82 in registry with each other, and which are adapted to receive a bushed connection for a trailing arm in a conventional manner.

The rearward hanger bracket 74, in a similar manner, includes a mounting plate 84, a support bracket 86, and a pair of depending arms 88. However, the mounting plate 84 and the support bracket 86 extend forwardly of the rearward hanger bracket 74 to provide an upper support for the air spring which is normally disposed in conventional manner between the forward trailing arm and the frame rail 12. Typically, the air spring is disposed in a centerline which is located inwardly of the frame rail 12 so that the upward force of the free end of the forward trailing arm is borne directly by the support bracket 86 and then translated to the cross beams 20 and the frame rails 12. Support brackets 90 are provided rearwardly of the rearward hanger bracket 74 to provide similar support to the air spring associated with the rearward trailing arm.

In normal operation of the slider suspension 10, substantial vertical and lateral forces are placed upon the suspension. Frequently, as the trailer moves over uneven ground, or negotiates a turn or curve, torque is placed on the axles of the wheels which causes uneven forces to be translated through the trailing arms to the subframe 21. This, in turn, tends to cause the slider suspension 10 to flex and introduces large lateral forces to the subframe 21. It can be seen that in the embodiment of FIG. 2, four connections are provided for distributing vertical loads for each frame rail 12, i.e., the brackets 72, 74 (for connecting the trailing arms) and the support brackets 86 and 90 (for connecting the air springs). However, where the leaf spring suspension of FIG. 1 has six lateral inputs into the subframe 21 (the six hanger brackets 14, 16, and 18), prior art trailing air suspension systems such as the embodiment of FIG. 2 have only four lateral inputs into the frame, i.e., the hanger brackets 72, 74. An air spring provides virtually no resistance to lateral forces. Thus, the connection between each hanger bracket 72, 74 and the frame rails 12 is subjected to higher stress than that of a leaf spring suspension. Additional structure support will maintain the integrity of the frame rails 12 and associated components of FIG. 2.

An improved slider suspension 10 according to the invention is illustrated in FIGS. 3 through 7. It can be seen in FIG. 3 that the subframe 21 is essentially the same as the subframe 21 of the prior art, but the means for supporting the trailing arm air suspension is significantly different. The means basically comprises a hanger bracket assembly 100 and an air spring bracket 102. Each axle (not shown) requires a pair of hanger bracket assemblies 100 and a pair of air spring brackets 102, and in the embodiment shown, the slider suspension 10 is adapted to support two axles.

Figure 3:
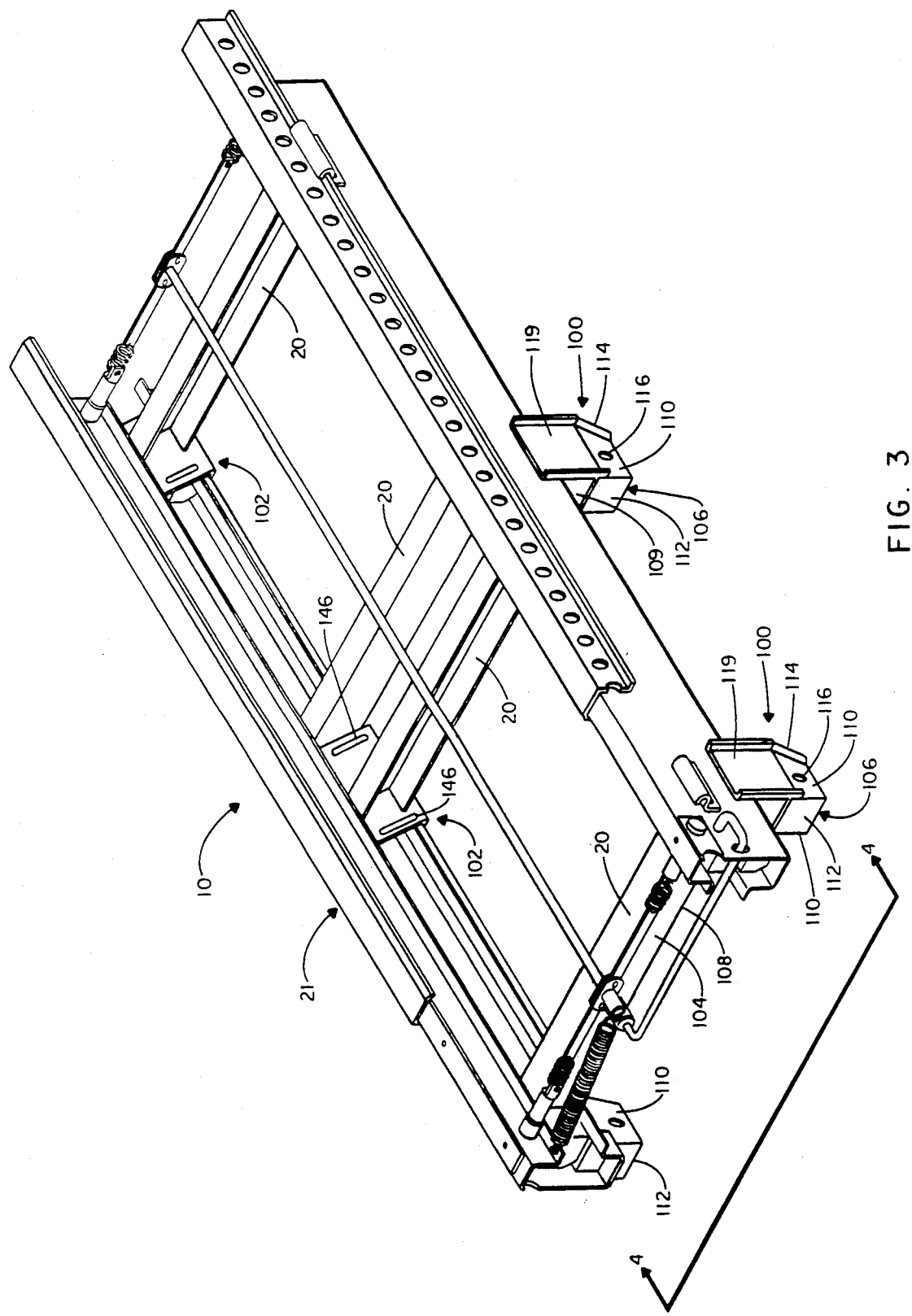
FIG. 3 is an isometric view of a subframe of a slider suspension with brackets for mounting a trailing arm air suspension to the subframe in accordance with the invention.
Figure 4:
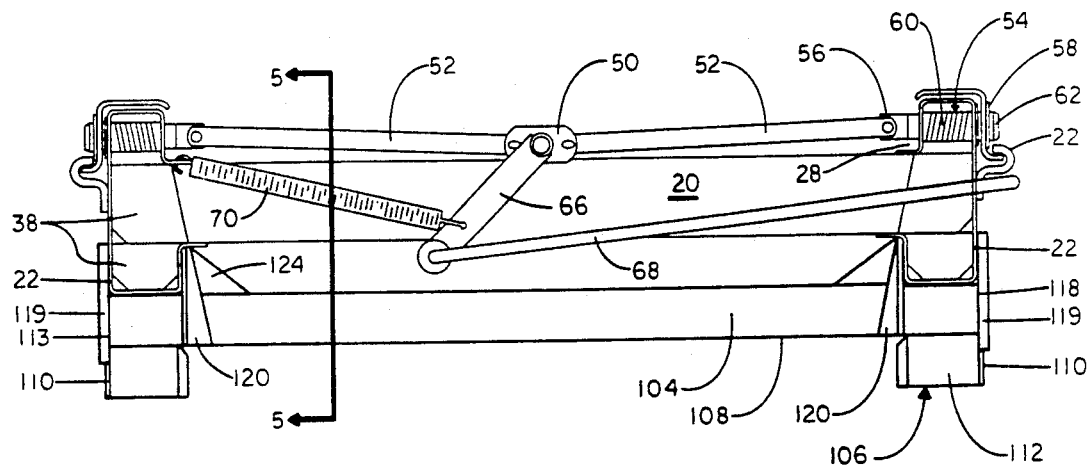
FIG. 4 is a front view of the slider suspension of FIG. 3 taken along lines 4—4.
Figure 5:
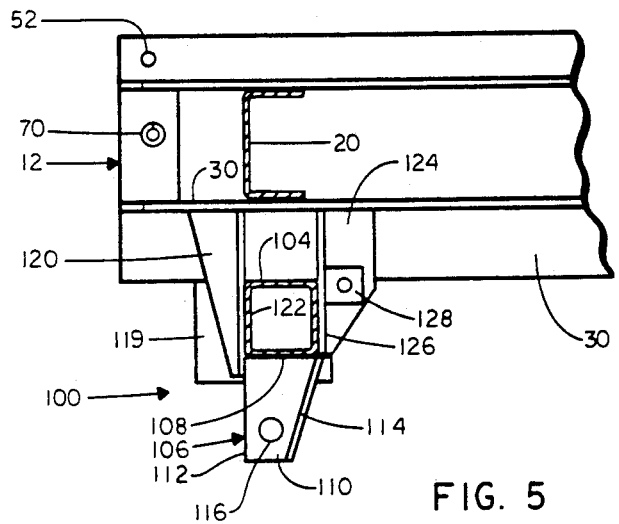
FIG. 5 is an elevational view of a hanger bracket mounted to the subframe and taken along lines 5—5 of FIG. 4.

As shown best in FIGS. 3 through 5, the hanger bracket assembly 100 comprises a box beam 104 which extends across the bottom of the slider suspension 10 and is welded to the bottom walls 26 of the opposing frame rails 12. In the embodiment shown, the box beam 104 is disposed directly beneath a frontward cross beam 20. A hanger bracket 106, which is shorter than a conventional hanger bracket of the prior art, is welded to a bottom surface 108 of the box beam 104 at each end thereof. Each hanger bracket 106 comprises a U-shaped bracket which includes rearwardly extending arms 110 integrally connected to each other by a web 112. Preferably, the arms 110 and the web 112 are welded to the bottom surface 108. Stiffener flanges 114 are provided at the distal end of each arm 110. A pair of apertures 116 in each arm are in registry with each other and adapted to receive a bushed connection with a trailing arm (not shown in FIGS. 3 through 5, but illustrated in FIG. 7) in a conventional manner. As shown in FIG. 4, it can be seen that the side wall 22 of the frame rail 12, the end 118 of the box beam 104, and the outboard arm 110 of the hanger bracket 106 are in vertical alignment. A channel gusset 119 is welded in this vertical alignment to the side wall 22, the end 118, and the outboard arm 110.

Figure 7:
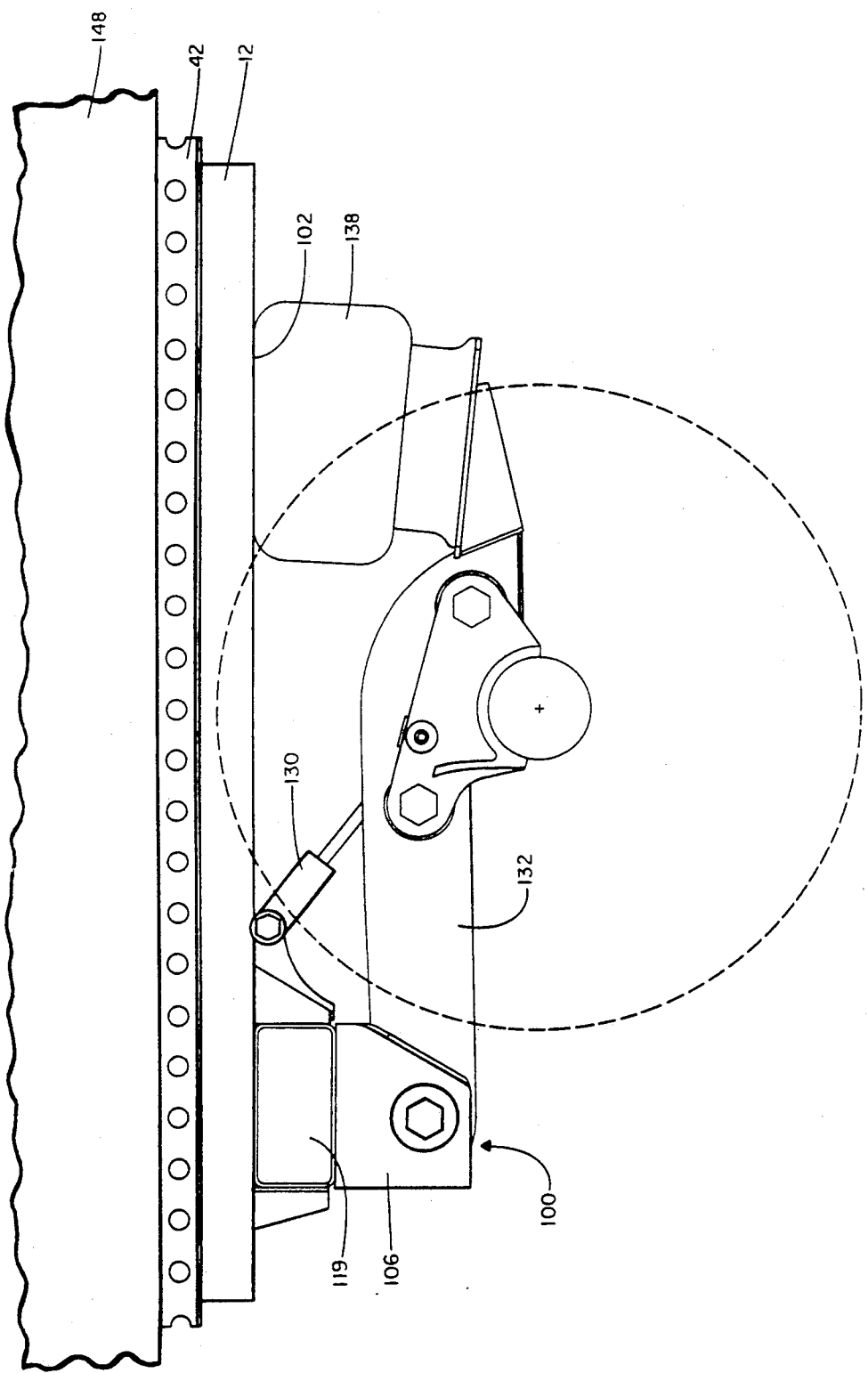
FIG. 7 is an elevational view of a trailing arm air suspension mounted to the subframe of a slider suspension according to the invention.

Looking now at FIGS. 4 and 5, it can be seen that a forward gusset 120 is welded to and between the lower flange 30 of the frame rail 12 and a forward surface 122 of the box beam 104. Similarly, a rearward gusset 124 is welded to and between the lower flange 30 and a rearward surface 126 of the box beam 104. A mounting bracket 128 is fixed to the rearward gusset 124 to provide an upper mounting for a shock absorber (not shown in FIG. 5). As shown in FIG. 7, the shock absorber 130 extends between the mounting bracket 128 and the trailing arm 132.

Figure 6:
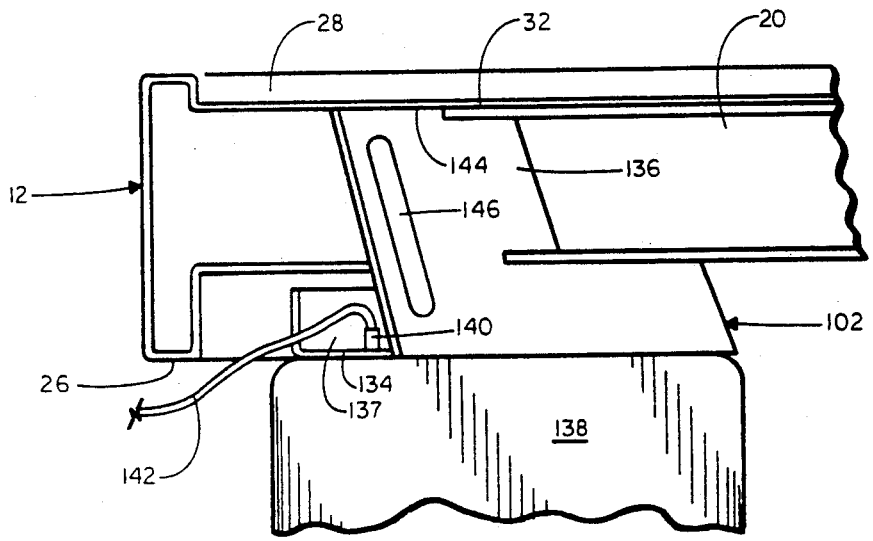
FIG. 6 is an isometric view of the air spring bracket according to the invention.

Turning now to FIG. 6, the air spring bracket 102 is angular in construction, having a substantially horizontal lower portion 134 and an upwardly angularly extending portion 136. A flange on the lower portion 134 is welded to the lower flange 30 of the frame rail 12 so that the lower portion 134 extends inwardly of the frame rail to support the upper end of an air spring 138. A pneumatic port 140 in the lower portion 134 conducts air under pressure from a conduit 142 into the air spring 138. The upwardly extending portion 136 is cut out to extend around a cross beam 20 and may be welded thereto. In addition, an upper edge 144 of the upwardly extending portion 136 is welded to the upper lip 32 of the frame rail 12. It can be seen that the air spring bracket 102 extends inwardly of the subframe 21 and then upwardly toward an upper portion of each frame rail. The air spring 138 is offset from the centerline of the frame rail 12, thereby producing a bending moment about the frame rail 12. The upwardly extending portion 136 transfers the bending moment to the upper top flange 28 of the frame rail 12. On the other hand, a top load on the top wall 24 of the frame rail 12 caused by the weight of the container resists the bending moment and braces the subframe 21. One or more ribs 146 on the upwardly extending portion 136 provide additional strength to the air spring bracket 102.

A complete suspension assembly according to the invention is illustrated in FIG. 7. A container 148 is mounted to the body rails 42 which are slidably received over the frame rails 12. The hanger bracket assembly 100 supports a pivotable connection to a trailing arm 132, and the air spring bracket 102 supports the upper end of an air spring 138 disposed between the free end of the trailing arm 132 and the frame rail 12. The hanger bracket assembly 100 and the air spring bracket 102 can be constructed of lighter weight materials than the hanger brackets 72, 74 and support brackets 86, 90 of the prior art. However, the plurality of connections provided in the invention enables more flexibility in the subframe 21. Thus, with lighter weight and thinner parts, all pieces of the subframe 21 work together as a unit and are flexible. Strength is obtained by the flexibility of the connections rather than the thickness of the material. Stresses are equalized throughout the subframe 21 so that excessive lateral forces due to uneven loading can be more readily absorbed.

It will be understood that reasonable variation and modification of the foregoing embodiments according to the invention are possible within the scope of the foregoing disclosure and drawings without departing from the spirit of the invention is defined in the appended claims.

The embodiments of the invention in which an exclusive property or privilege is claimed are defined as follows:

1. In a slider comprising a subframe and a suspension, the subframe having a pair of parallel spaced frame rails with outer faces and a connection for mounting the suspension to the subframe, the suspension including a trailing arm, the improvement in the connection comprising:
   a beam disposed beneath the frame rails and extending from one frame rail to the other frame rail and connected to the frame rails;
   a hanger bracket having an upper portion thereof mounted to a lower surface of the beam and adapted to pivotably mount the trailing arm, the hanger bracket having a depending vertical face; and
   a gusset extending along an outer face of one of the frame rails, across an end of the beam, and along the depending vertical face of the hanger bracket, the gusset being rigidly connected to at least the frame rail outer face and the hanger bracket vertical face to provide lateral strength between the hanger bracket and the frame rail.

2. The connection according to claim 1 wherein the beam is welded to the frame rails, the hanger bracket is welded to the beam, and the gusset is welded to at least the frame rail outer face and the hanger bracket vertical face.

3. The connection according to claim 1 wherein the hanger bracket has a pair of arms mounted to the lower surface and the vertical face is on one of the arms and the vertical face, and the frame rail outer face are substantially in the same plane.

4. The connection according to claim 3 wherein the gusset is a plate formed with a channel.

5. The connection according to claim 4 wherein the channel plate is mounted by welding.

6. The connection according to claim 5 wherein a second gusset is mounted to the beam and to the one frame rail.

7. The connection according to claim 4 wherein a second gusset is mounted to the beam and to the one frame rail.

8. In a slider suspension comprising a subframe and a suspension, wherein the subframe has a pair of parallel frame rails and connection means to connect the suspension to the subframe, each frame rail has a lower portion and an upper portion, and the suspension includes an air spring, the centerline of which is offset horizontally from one of the frame rails, the improvement in the connection means comprising:

a one-piece support bracket having a lower flange and an upper flange, the lower flange being adapted to mount an upper end of the air spring and disposed generally parallel to a plane extending through the pair of frame rails and mounted to said lower portion, the upper flange extending at an acute angle relative to the lower flange and connected to said upper portion so that the bending moment created by the horizontal offset when a load is placed on the air spring will be transferred to the upper portion.

9. The connection means according to claim 8 wherein the upper flange includes a strengthening rib.

10. The connection means according to claim 8 wherein the lower flange and upper flange are mounted to the lower portion and upper portion, respectively, by welding.

11. A slider suspension comprising:
a pair of frame rails disposed parallel to each other;
a beam extending beneath the frame rails from an outer portion of one frame rail to an outer portion of the other and connected to the frame rails near the outer portions;
a hanger bracket having an upper portion thereof mounted to a lower surface of the beam;
a gusset mounted to the beam and to one of the hangar bracket and the one frame rail to provide lateral strength between the beam and the one of the hangar bracket and frame rail;
a trailing arm having first and second ends, the first end pivotably connected to the hanger bracket so that the second end is free to move relative to the one frame rail;
a support bracket mounted to the one frame rail; and
an air spring mounted between the trailing arm and the support bracket for cushioning movement of the second end relative to the one frame rail.

12. A slider suspension according to claim 11 wherein the support bracket has a lower flange and an upper flange, the lower flange mounts an upper end of the air spring and is disposed generally parallel to a plane extending through the pair of frame rails and mounted to a lower portion of the one frame rail, and the upper flange extends at an acute angle relative to the lower flange and is connected to an upper portion of the one frame rail.

13. A slider suspension according to claim 12 wherein the lower flange and upper flange are mounted to the lower portion and upper portion, respectively, by welding.

14. The connection according to claim 1 wherein the gusset is rigidly connected to the end of the beam.

* * * * *